United States Patent [19]

Kashiwagi

[11] Patent Number: 5,260,992
[45] Date of Patent: Nov. 9, 1993

[54] KEY TELEPHONE SYSTEM WITH REDUCTION OF DELAY OF RING TONE GENERATION AT TELEPHONE SET

[75] Inventor: Koichiro Kashiwagi, Tokyo, Japan
[73] Assignee: NEC Corporation, Tokyo, Japan
[21] Appl. No.: 855,517
[22] Filed: Mar. 20, 1992
[30] Foreign Application Priority Data
  Mar. 20, 1991 [JP] Japan ................... 3-55331
[51] Int. Cl.⁵ ............................................. H04M 1/26
[52] U.S. Cl. ................................. 379/165; 379/253; 379/373
[58] Field of Search ............. 379/165, 164, 179, 252, 379/373, 375, 253

[56] References Cited

U.S. PATENT DOCUMENTS 4,646,347  2/1987  Liu ......................... 379/164
5,073,922  12/1991  Okada .................... 379/164

Primary Examiner—Curtis Kuntz
Assistant Examiner—Paul Loomis
Attorney, Agent, or Firm—Foley & Lardner

[57] ABSTRACT

A plurality of trunk interface blocks are provided to receive a plurality of telephone lines. In each trunk interface block, a ringing signal detection circuit detects an incoming ringing signal on the corresponding telephone line, and a code insertion circuit inserts in a PCM signal, coded data indicative of whether or not an individual ringing signal exists on the telephone line in response to the output of the ringing signal detection circuit. The PCM signal is transferred through a PCM time division switch and an extension interface circuit to a destination extension set. In the destination extension set, the code discrimination circuit extracts coded data from the PCM signal and controls the on-off circuit to drive the speaker in synchronization with the individual ringing signals.

4 Claims, 5 Drawing Sheets

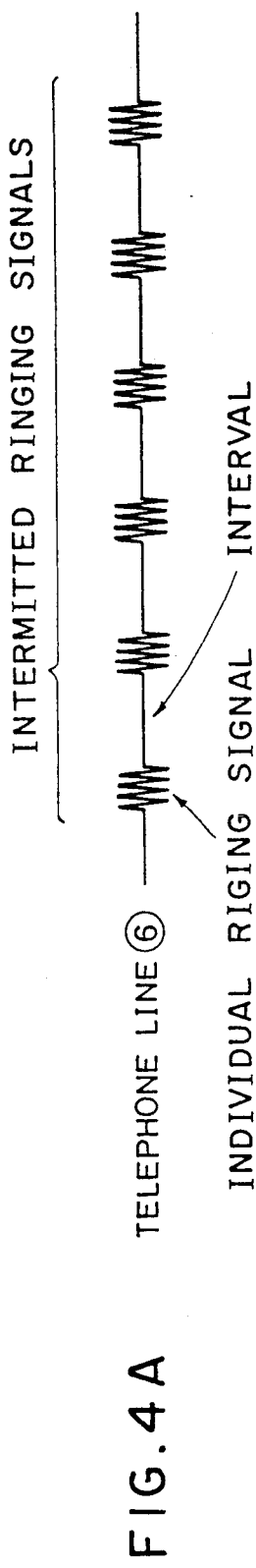
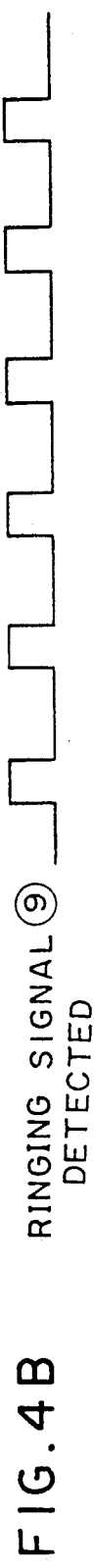
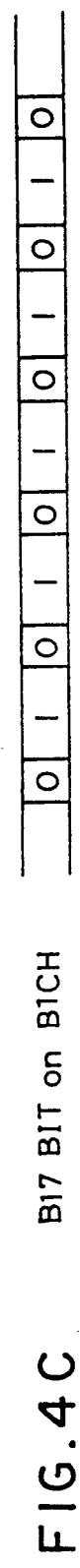
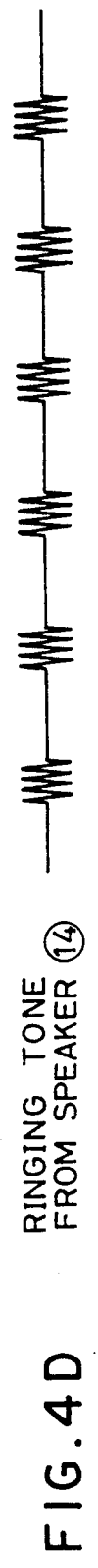
FIG. 4A  TELEPHONE LINE ⑥ — INTERMITTED RINGING SIGNALS / INDIVIDUAL RIGING SIGNAL INTERVAL
FIG. 4B  RINGING SIGNAL ⑨ DETECTED
FIG. 4C  B17 BIT on B1CH
FIG. 4D  RINGING TONE FROM SPEAKER ⑭

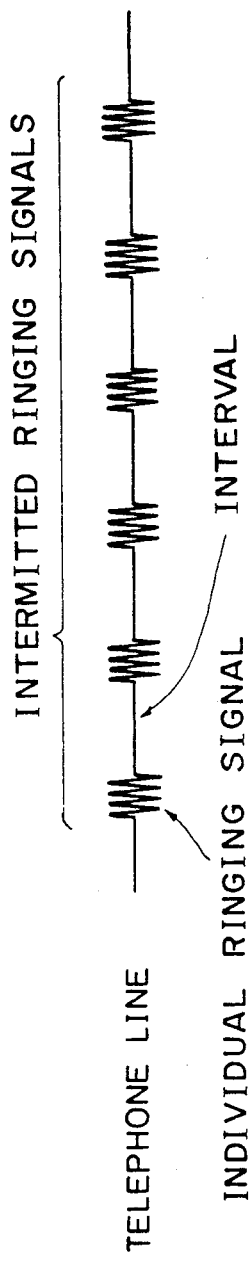
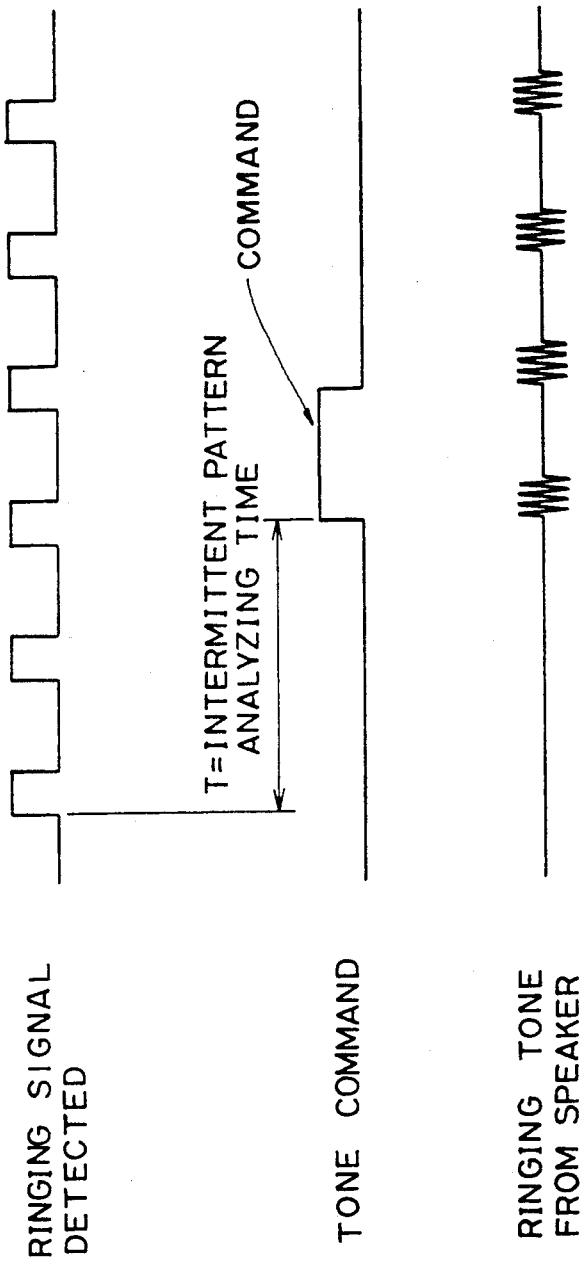
FIG.5A PRIOR ART
FIG.5B PRIOR ART
FIG.5C PRIOR ART
FIG.5D PRIOR ART

KEY TELEPHONE SYSTEM WITH REDUCTION OF DELAY OF RING TONE GENERATION AT TELEPHONE SET

FIELD OF THE INVENTION

The present invention relates to key telephone systems and, in particular to such a key telephone system which generates a ringing tone (or a ringing sound) from extension sets in synchronization with incoming ringing signals from the respective telephone lines.

BACKGROUND OF THE INVENTION

Conventional key telephone systems detect incoming intermittent ringing signals, analyze an intermittent pattern of the ringing signals with a microprocessor of a main unit, select the closest one of the analyzed pattern among prototype patterns stored in the microprocessor, and then generate a ringing tone in synchronization with the prototype pattern thus selected.

Therefore, in the conventional key telephone systems, processes executed by the microprocessor are complicated due to that analysis of the intermittent pattern of the ringing signals; a required time to analyze the intermittent pattern of the ringing signals causes a delay in beginning the ringing tone; and it is required to store a variety of prototype patterns in order to correctly simulate the incoming ringing signals.

SUMMARY OF THE INVENTION

An object of the present invention is to provide an improved key telephone system in which the processing load to the microprocessor is reduced.

Another object of the invention is to provide an improved key telephone system in which a ringing tone starts immediately after the leading portion of the arrival ringing signals is incoming.

A further object of the invention is to provide an improved key telephone system in which a variety of prototype intermittent patterns do not need to be stored in the microprocessor.

According to the present invention, for achieving the above objects the intermittent pattern of incoming ringing signals on each telephone line in a key telephone system is transferred directly, through a PCM signal line, to a destination extension set, and the extension set generates a ringing tone in synchronization with the intermittent pattern thus transferred.

BRIEF DESCRIPTION OF THE DRAWINGS

FIGS. 4A-4D show timing charts of several signals related to the above embodiment.

FIGS. 5A-5D show the timing charts of a conventional key telephone system corresponding to those in FIG. 4.

DETAILED DESCRIPTION OF A PREFERRED EMBODIMENT

Figure 1:
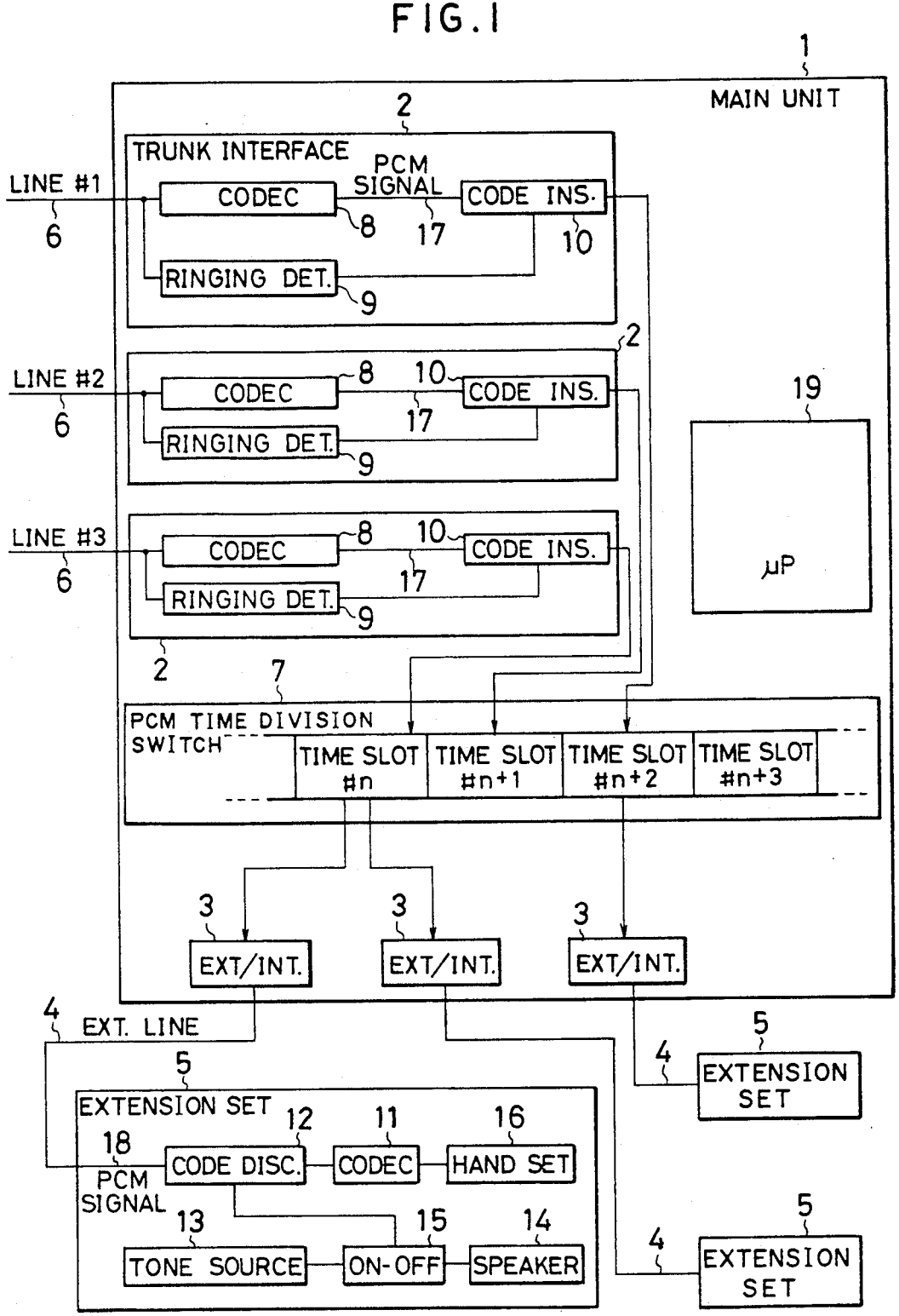
FIG. 1 is a block diagram illustrating the embodiment of the present invention.

FIG. 1 shows a key telephone system embodying the invention. In this figure, a main unit 1 consists of a plurality of trunk interface blocks 2, a PCM time division switch 7, extension interface blocks 3 and microprocessor 19. Each trunk interface block 2 has a CODEC 8, a ringing signal detection circuit 9 and a code insertion circuit 10. The CODEC 8 and the detection circuit 9 are connected to a telephone line 6. A PCM signal line 17 from the CODEC 8 is connected to the switch 7 via the code insertion circuit 10. The detection circuit 9 is connected to the code insertion circuit 10.

The switch 7 achieves conversion of time slots. An time slot is connected to the extension interface block 3 which is in turn connected to the extension set 5 through transmission line 4.

The microprocessor 19 controls the trunk interface blocks 2, the extension interface blocks 3, the PCM time division switch 7 and other structural components (not shown) in the main unit 1 and controls various operations in the main unit 1. However, the microprocessor 19 does not analyze the intermittent pattern of the incoming ringing signals.

Still referring to FIG. 1, each extension set 5 includes a CODEC 11, a code discrimination circuit 12 a ringing tone source circuit 13, a speaker 14, an on-off circuit 15, and hand set 16. A PCM signal line 18 is connected, via the code discrimination circuit 12, to the CODEC 11 which is in turn connected to the hand set 16. The source circuit 13 is connected to the speaker 14 through the on-off circuit 15 which is connected to the code discrimination circuit 12.

Figure 2:
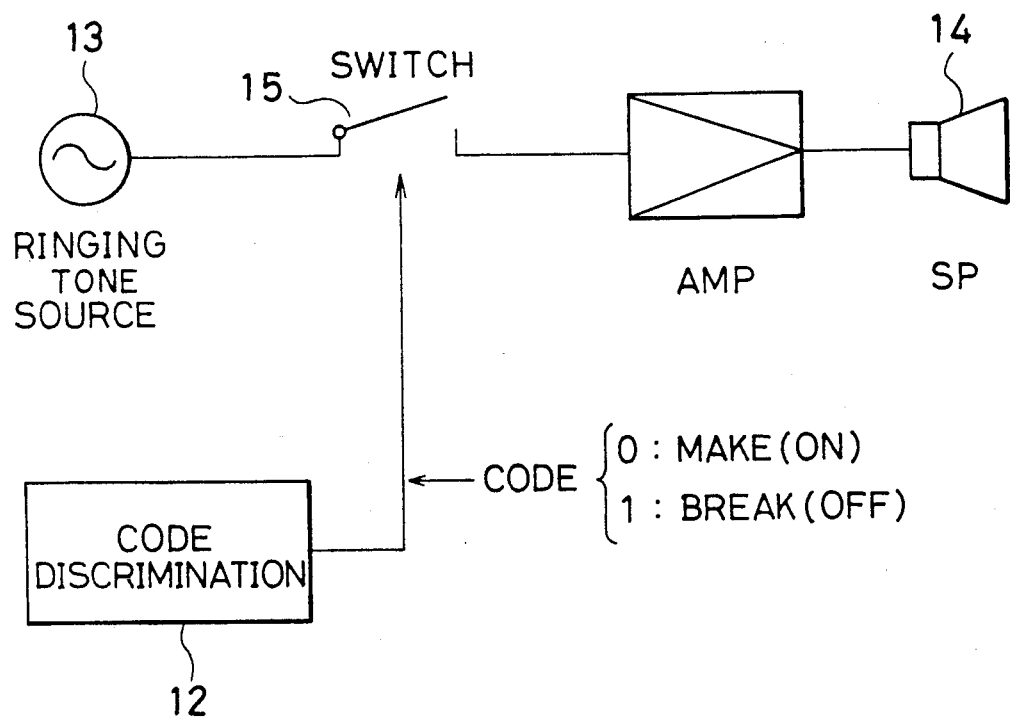
FIG. 2 illustrates the operation of the on-off circuits 15 of the above embodiment.

The on-off circuit 15 is for example an electronic switch as shown in FIG. 2. The electronic switch 15 is arranged to become on when the code discrimination circuit 12 extracts a predetermined code "0", and become off when the circuit 12 extracts a predetermined code "1".

Figure 3A:
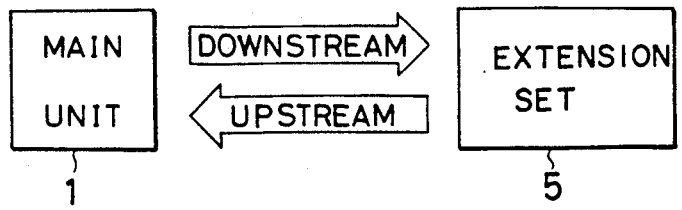
FIGS. 3A-3C illustrate the format of the PCM signal used in the above embodiment.
Figure 3B:
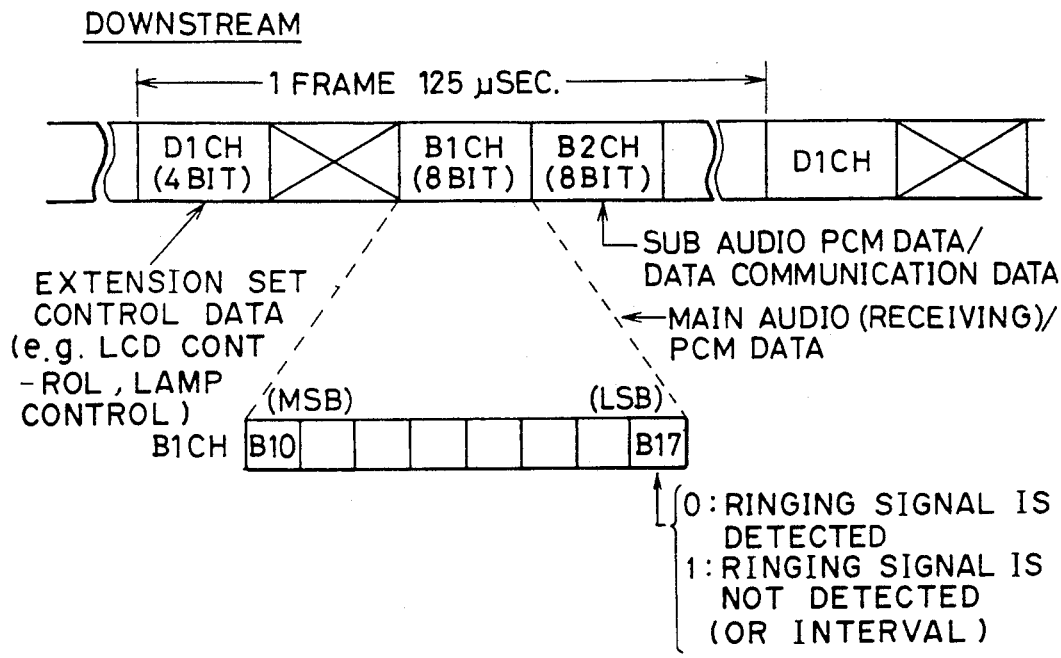
Figure 3C:
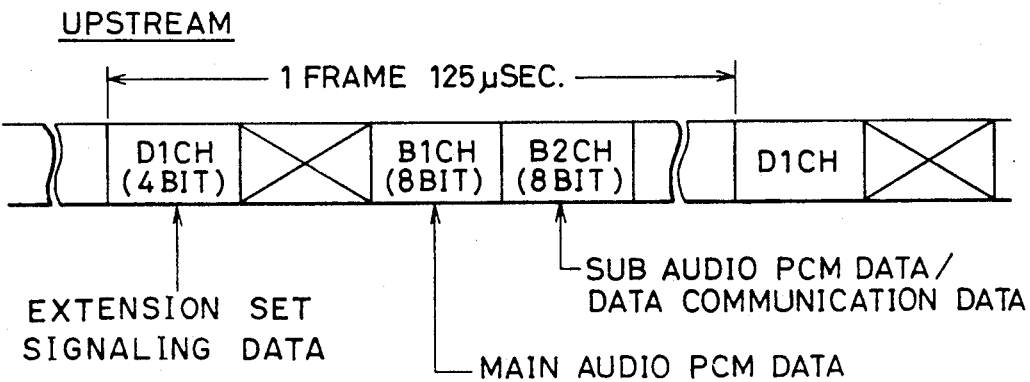

FIGS. 3A-3C show the formats of signals on the extension transmission lines 4 between the main unit 1 and the extension sets 5. A downstream signal which is transferred from the main unit 1 to one of the extension sets 5 (FIG. 3A), is composed of a plurality of 125 micro second frames and the frames have a format as shown in FIG. 3B. The fields Dlch, B1ch and B2ch are for extension set control data (4 bits), main audio PCM data (8 bits) and sub audio PCM data (8 bits) respectively. This format is conventional except signal bit data B17 indicating whether or not the individual ringing signal exists on the line 6 is inserted at the last or trailing bit of the B1ch field while the destination extension line 4 is not busy, While the line 4 is busy, all the bits of the B1ch field are occupied with main audio PCM data as usual.

As shown in FIG. 3C, an upstream signal is configured as usual and composed of 125 micro second frames. As for the upstream signal, the Dlch field is used for extension set signaling data such as button information, and the B1ch and B2ch fields are used for main and sub audio PCM data respectively.

FIGS. 4A-4D show timing charts of several signals related to the operations of this embodiment, and FIGS. 5A-5D shows comparative timing charts of conventional systems.

In operation, when the intermittent ringing signals are transferred onto the telephone lines 6 as shown in FIG. 4A, the corresponding detection circuit 9 detects them and outputs detection signals as shown in FIG. 4B. That is, the detection circuit 9 generates digital codes "0" or "1" responsive to the resumption and stopping of the ringing signal and then transfers the codes to the code insertion circuit 10, which inserts the codes at the last bit of the Blch field of the PCM data on the PCM signal line 17 as shown in FIG. 4C. The PCM signal is transferred onto the PCM signal line 18 in a destination extension set 5 through the PCM time division switch 7, the corresponding extension interface block 3 and the extension transmission line 4. Then, the code discrimination circuit 12 extracts the codes in the PCM signal, and controls the on-off circuits 15 based on the extracted codes (FIG. 2). The speaker 14 is accordingly driven intermittently in synchronization with the individual ringing signals as shown in FIG. 4D.

It should be noted that the speaker 14 begins to make a ringing tone at almost the same time when the first individual ringing signal is transferred onto the telephone line 6, as shown in FIG. 4.

In a conventional key telephone system, the detection signals from a ringing signal detection circuit are transferred directly to a microprocessor, which analyzes the pattern of the detection signals and generates a command including a pattern code indicating the identified ringing pattern and an operation code indicating the start of the ringing tone as shown in FIG. 5. The command is transferred to the destination extension set and is analyzed to cause a ringing tone from a speaker. The start of the ringing tone is delayed by the time required to analyze the ringing signal pattern T as shown in FIG. 5B.

According to the present invention, the intermittent pattern of the incoming ringing signals on a telephone line is transferred directly, through PCM signal lines, to a extension set, and the extension set generates a ringing tone in synchronization with the intermittent pattern thus transferred. Therefore, the processing load to the microprocessor is reduced, and the ringing tone starts immediately after the leading portion of the ringing signals is incoming, because it is not needed to analyze the intermittent pattern of the ringing signals. Further, it is not needed to store a variety of prototype intermittent patterns, because the ringing tone is produced with fidelity in synchronization with the actual intermittent pattern of the ringing signals.

Although an embodiment of the present invention has been described, it is understood that numerous variations may be made in accordance with the principles of the invention.

What is claimed is:

1. A key telephone system having a main unit, one or more extension sets, and extension transmission lines connecting said main unit and said extension sets, said main unit receiving one or more telephone lines, and having, for each of said telephone lines, a ringing signal detection circuit and a first CODEC both connected to a corresponding one of said telephone lines, and a first PCM signal line connected to said first CODEC, and further having a time division switch connected to said first PCM signal lines, and extension signal interface means connected to said time division switch and said extension transmission lines, each of said extension sets having a second PCM signal line connected to a corresponding one of said extension transmission lines, a second CODEC connected to said second PCM signal line, a hand set connected to said second CODEC, a ringing tone source, and an on-off circuit connected to said ringing tone source, and a speaker connected to said on-off circuit, comprising:

a code insertion circuit provided for each of said telephone lines, and connected to a corresponding one of said telephone lines, and connected to a corresponding one of said first PCM signal lines, for generating a digital code responsive to an output of a corresponding one of said ringing signal detection circuits, and inserting said code in a PCM signal on a corresponding one of said first PCM signal lines, said code indicating whether or not an individual ringing signal exists on a corresponding one of said telephone lines;

a code discrimination circuit provided for each of said extension sets, and connected to a corresponding one of said second PCM signal lines, and connected to a corresponding one of said on-off circuits, for extracting said code from said PCM signal on a corresponding one of said second PCM signal lines and sending said code to a corresponding one of said on-off circuits; and said on-off circuit supplying a ringing tone signal form said ringing tone source to said speaker in synchronization with said individual ringing signals on said telephone lines.

2. A key telephone system according to claim 1, characterized in that said code is composed of one bit.

3. A key telephone system according to claim 2, characterized in that said one bit is inserted at a predetermined bit position of PCM words of a predetermined PCM channel.

4. In a key telephone system having a main unit, one or more extension sets, and extension transmission lines connecting said main unit and said extension sets, said main unit receiving one or more telephone lines, and having, for each of said telephone lines, a ringing signal detection circuit and a first CODEC both connected to a corresponding one of said telephone lines, and a first PCM signal line connected to said first CODEC, and further having a time division switch connected to said first PCM signal lines, and extension signal interface means connected to said time division switch and said extension transmission lines, each of said extension sets having a second PCM signal line connected to a corresponding one of said extension transmission lines, a second CODEC connected to said second PCM signal line, a hand set connected to said second CODEC, a ringing tone source, and an on-off circuit connected to said ringing tone source, and a speaker connected to said on-off circuit, a method for generating a ringing tone comprising the steps of:

detecting individual ringing signals of an incoming intermittent ringing signal on said telephone lines;

inserting a code indicative of whether or not said individual ringing signal exists on said telephone lines, in a PCM signal on said first PCM signal line;

transferring said PCM signal onto said second PCM signal line through said first PCM signal line, said time division switch and said extension signal interface means;

extracting said code from said PCM signal on said second PCM signal line;

responsive to said code thus extracted, controlling said on-off circuit; and providing a ringing tone signal from said ringing tone source to said speaker through said on-off circuit in synchronization with said individual ringing signals.

* * * * *